United States Patent [19]

Keefer et al.

[11] Patent Number: 4,587,224
[45] Date of Patent: May 6, 1986

[54] GLASS CERAMIC TOUGHENED WITH TETRAGONAL ZIRCONIA

[75] Inventors: Keith D. Keefer, Albuquerque; Terry A. Michalske, Sandia Park, both of N. Mex.

[73] Assignee: The United States of America as represented by the United States Department of Energy, Washington, D.C.

[21] Appl. No.: 578,898

[22] Filed: Feb. 10, 1984

[51] Int. Cl.$^4$ .................. C03C 10/02; C03C 10/04; C03C 10/14
[52] U.S. Cl. .......................... 501/4; 501/5; 501/10
[58] Field of Search ................. 501/4.5, 10

[56] References Cited

U.S. PATENT DOCUMENTS

| | | |
|---|---|---|
| 3,252,811 | 5/1966 | Beall . |
| 3,809,543 | 5/1974 | Gaskell et al. ............ 501/4 |
| 3,926,602 | 12/1975 | Andrus . |
| 3,967,969 | 7/1976 | Busby et al. ............ 501/10 |
| 4,126,477 | 11/1978 | Reade ..................... 501/10 |
| 4,314,909 | 2/1982 | Beall et al. .............. 501/10 |

OTHER PUBLICATIONS

Subbaro, E. C.; "Zirconia-an Overview" in Science and Technology of Zirconia, Heuer & Hobbs, eds., Am. Ceramic Soc., 1981.
Yokoishi, S. et al., "Effect of Heat Treatments for Precipitation of $ZrO_2$ on Transparency of Glass Ceramics in the $ZrO-Al_2O_3-SiO_2$ System", Yogyo-Kyokai-shi 88 [1] 13 (1980), pp. 13-21.
Claussen, N.; "Design of Transformation-Toughened Ceramics" in Science & Technology of Zirconia, A. H. Heuer & L. W. Hobbs, eds., Am. Ceramic Soc., 1981.
Fagherazzi, G. et al.; "A Structural Study of Metastable Tetragonal Zirconia in an $Al_2O_3-ZrO_2-SiO_2-Na_2O$ Glass Ceramic System".
Sircar, A. et al., "Phase Equilibria in Ternary Systems Containing Zirconia Silica, IV, $Na_2O-ZrO_2-SiO_2$", Trans. Brit. Ceramic Soc. V69, 131-135, 1970.
Das, C. R., "Chemical Durability of Sodium Silicate Glasses Containing $Al_2O$ & $ZrO_2$", Heuer & Hobbs, eds., Am. Ceramic Soc., 1981.

Primary Examiner—Mark L. Bell
Attorney, Agent, or Firm—Armand McMillan; Albert Sopp; Judson R. Hightower

[57] ABSTRACT

A phase transformation-toughened glass ceramic and a process for making it are disclosed. A mixture of particulate network-forming oxide, network-modifying oxide, and zirconium oxide is heated to yield a homogeneous melt, and this melt is then heat-treated to precipitate an appreciable quantity of tetragonal zirconia, which is retained at ambient temperature to form a phase transformation-toughened glass ceramic. Nucleating agents and stabilizing agents may be added to the mixture to facilitate processing and improve the ceramic's properties. Preferably, the mixture is first melted at a temperature from 1200° to 1700° C. and is then heat-treated at a temperature within the range of 800° to 1200° C. in order to precipitate tetragonal $ZrO_2$.

The composition, as well as the length and temperature of the heat-treatment, must be carefully controlled to prevent solution of the precipitated tetragonal zirconia and subsequent conversion to the monoclinic phase.

2 Claims, 1 Drawing Figure

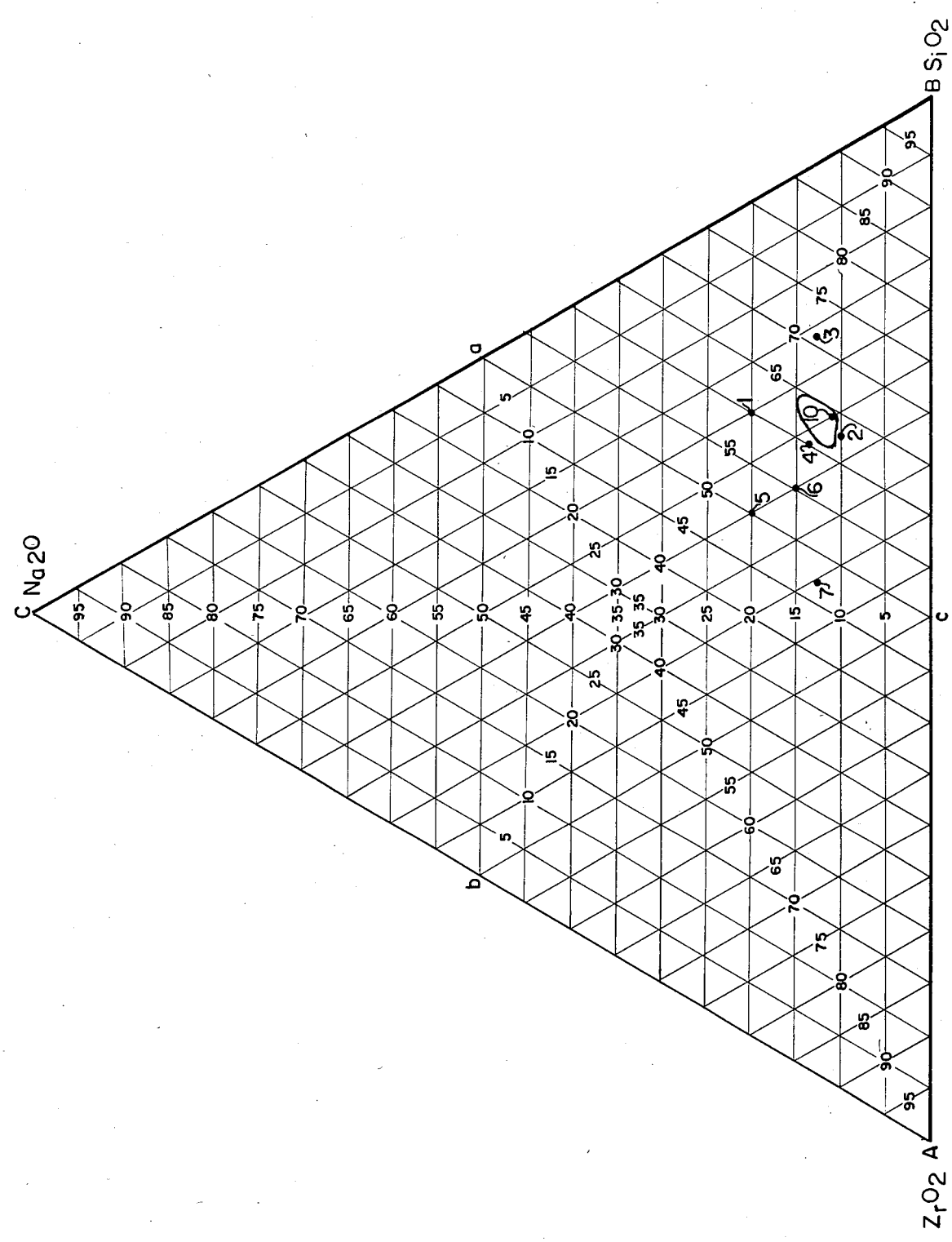

GLASS CERAMIC TOUGHENED WITH TETRAGONAL ZIRCONIA

The United States Government has rights in this invention pursuant to Contract No. DE-AC04-76DP00789 between the U.S. Department of Energy and AT&T Technologies, Inc.

FIELD OF THE INVENTION

The present invention relates generally to ceramics, and more particularly to a phase transformation-toughened glass ceramic.

BACKGROUND OF THE INVENTION

Glasses are very useful dielectric materials because they can be easily formed into a wide variety of shapes and also because they can be chemically bonded to metals to form a hermetic seal. However, they are brittle materials with low toughness, this being a limit to their use in structural applications. The toughness of glasses may be improved by dispersing in them particulates, such as whiskers and fibers. In most cases however, the improved toughness is accompanied by reduced strength because these additives increase the size of the inherent internal flaws that ultimately cause failure.

Glass ceramics exhibit high strength while still retaining the ability of being easily formed into complex shapes by means of standard glass forming techniques, as well as the ability to form hermetic seals. Glass ceramics are produced by melting a glass-forming batch, cooling the melt and shaping a glass article therefrom, and subsequently heat-treating the glass article within a particular temperature range for the period of time necessary to develop the desired internal crystallization. This crystallization or precipitation process permits precise control of crystal size, volume fraction, and distribution in the final material.

Conventional ceramic processing requires the mechanical mixing of the component crystalline phases, followed by heating. This process results in an inherent lack of homogeneity, along with a strict dependence of the final crystalline microstructure upon the starting materials.

It has been disclosed in the prior art that both the strength and toughness of a conventional ceramic material can be improved by dispersing particles of $ZrO_2$ in the original mixture of the material. This has been done with alumina ceramics, as reported in "Design of Transformation-Toughened Ceramics" by N. Claussen and M. Ruhle in *Science and Technology of Zirconia*, A. Heuer and L. W. Hobbs, eds, American Ceramic Society, 1981. It is postulated that the $ZrO_2$ particles improve the material toughness in the following manner. Assuming that the $ZrO_2$ is retained in the metastable tetragonal phase, the $ZrO_2$ particles are transformed into the stable, monoclinic phase in the stress field near a crack tip and shield the crack tip from an applied stress. Because the crystals can be kept small and still can be transformed, the inherent flaws that they introduce are also small, and the strength of the material is thereby increased. It should be noted that these $ZrO_2$ particles are initially added to the original starting materials and remain as crystalline $ZrO_2$ throughout the entire processing sequence.

The use of zirconia in glass ceramic bodies has also been disclosed. For example, in U.S. Pat. No. 3,252,811, zirconia is incorporated as a nucleating agent to produce a transparent glass ceramic body with very high strength and excellent resistance to thermal shock. The use of $TiO_2$ and $ZrO_2$ as nucleating agents in glass ceramic articles is taught in U.S. Pat. Nos. 3,926,660 (Andress et al) and 4,126,477 (Reed). A glass ceramic that is particularly adapted for incorporation of radioactive waste is shown in U.S. Pat. No. 4,314,909 (Beall et al). The process for making the glass ceramic employs cubic or tetragonal $ZrO_2$ solid solution.

Incorporation of tetragonal $ZrO_2$ in a glass matrix has also been disclosed. For example, in an article entitled "A Structural Study of Metastable Tetragonal Zirconia in an $Al_2O_3$-$ZrO_2$-$SiO_2$-$Na_2O$ Glass Ceramic System," by G. Fagherazzi, G. Enzo, V. Gottardi, and G. Scarinci in *Journal of Material Science*, 1980, pages 2693 to 2700, the structural and microstructural properties of metastable zirconia in a glassy system are discussed. The peculiarly small size of the precipitated zirconia crystallites is confirmed in the stabilization of the tetragonal form of $ZrO_2$ with respect to the stable monoclinic one, and is explained in terms of a contribution to the amount of free energy due to strain energy in addition to the previously hypothesized surface energy. Another article discussing $ZrO_2$ in a glass system is "Phase Equilibria in Ternary Systems Containing Zirconia Silica" by A. Sircar and N. Brett, appearing in *Ceramic Society* volume 69, pages 131–135, 1970. The presence of uncrystallized $ZrO_2$, remaining as a chemical component of the glass matrix, has also been shown to increase the resistance to attack by aqueous alkali. This is discussed in an article entitled "Chemical Durability of Sodium Silicate Glasses containing $Al_2O_3$ and $ZrO_2$" by C. R. Das appearing in *Journal of the American Ceramics Society*, volume 64, No. 4, pages 188–193, April 1981.

It is an object of this invention to provide a glass ceramic toughened with tetragonal zirconia. Another object is to provide a toughened glass ceramic that can be shaped by standard glass-forming techniques. A further object is to provide a glass ceramic that is particularly adapted for use as a structural ceramic insulating material in devices such as neutron tubes and switches. A further object is to provide a glass ceramic particularly suited for forming ceramic fibers for use in composite materials. A still further object is to provide a glass ceramic particularly effective in reinforcing concrete.

Upon further study of the specification and appended claims, further objects and advantages of the invention will become apparent to those skilled in the art.

SUMMARY OF THE INVENTION

In accordance with this invention, a phase tranformation-toughened glass ceramic is prepared by: (a) preparing a mixture of a network-forming oxide, a network-modifying oxide and a substantial quantity of zirconia; (b) heating the mixture at a temperature lower than 1700° C. to obtain a homogeneous melt; (c) heat-treating the mixture at a temperature lower than its melting point and higher than its transition temperature for a period of time short enough to prevent significant transformation of the precipitating tetragonal zirconia into monoclinic zirconia; (d) annealing the mixture at a temperature within the range of 500°–900° C.; and (e) cooling the resulting glass ceramic to ambient temperature.

The mixtures of the invention may also contain nucleating agents, as well as conventional stabilizing agents for tetragonal zirconia.

BRIEF DESCRIPTION OF THE DRAWING

The single FIGURE consists of a triangular plot showing the phase transformation-toughened glass ceramic-forming region of a ternary oxide composition specified in weight percent.

DETAILED DESCRIPTION OF THE PREFERRED EMBODIMENT

Zirconia ($ZrO_2$) is a relatively abundant oxide with a number of remarkable properties. In "Zirconia-An Overview" by E. C. Subbaro, in *Science and Technology of Zirconia*, A. H. Heuer and L. W. Hobbs, eds., American Ceramic Society, 1981, the major features of zirconia are discussed. Among the properties discussed are crystal structure, phase transitions, mechanical behavior of partially stabilized zirconia, and stabilization. In particular, it is shown that zirconia exhibits a monoclinic to tetragonal transition at 1170° C. and a reverse transition between 850° and 1000° C., depending on the surface and strain energies associated with the forward transformation. It can thus be seen that this transformation exhibits a large thermal hysteresis. Thus, although the tetragonal zirconia phase is stable above 1200° C., the zirconia spontaneously transforms to the monoclinic form at about 900° C. unless constrained. Zirconia also exhibits a tetragonal to cubic transformation at 2370° C.

According to the method of the present invention, a phase transformation-toughened glass ceramic having improved characteristics of fracture toughness, hardness, and resistance to alkali is produced in the following manner. Initially, a composition of a network forming oxide, a network modifying oxide, and substantial quantities of $ZrO_2$ is prepared. Preferably, a nucleating agent such as platinum is also included. The composition is then melted to a homogeneous glass at a temperature below 1700° C. In this molten state, objects can be fabricated by means of standard glass forming techniques. At this temperature, $ZrO_2$ is dissolved in the glass melt and thus does not exist in a crystalline state.

As with conventional glass ceramic techniques, the glass melt may then be quenched to a glass. However, in order to retain an appreciable quantity of the zirconia in the tetragonal phase, the glass melt of the present invention must either solidify to a glass at a temperature above 900° C. or undergo a carefully controlled heat treatment so that the tetragonal zirconia initially formed at 1200° C. does not redissolve and reprecipitate in the monoclinic form.

More specifically, the homogeneous mixture is heat-treated at a temperature lower than its melting point and higher than its glass transition temperature. At a heat treatment temperature of about 1200° C., a minimum period of about one hour is required, with no maximum limit indicated. Heat treatments at 1200° C. to 800° C. require minimum times ranging from about 15 minutes to three hours, depending on particular glass melt compositions. In any case, once the tetragonal zirconia has precipitated from the glass melt, the heat treatment should not continue for more than 15 to 30 minutes, unless a stabilizing agent is present. In the latter case, a treatment of 30 to 60 minutes can be carried out.

Heat treating the glass mixture in this manner yields tetragonal zirconia crystals of such a large size that, unlike those of Fagherazzi et al (discussed earlier), they are not stabilized by surface energy effects. They are metastable, and they do transform to the monoclinic form under mechanical stress, thus producing a toughening effect in the glass ceramic. The glass ceramic obtained in this manner further possesses excellent resistance to attack by aqueous alkali because of the presence of the uncrystallized zirconia which remains in the glass matrix.

It should be noted, before ending the description of the process of the invention, that all glass ceramics should be annealed after ceramming to relieve internal stress in their glass matrix phase. The specific appropriate times and temperatures are easily determined by methods well established in the prior art. A temperature within the range of about 500° to 900° C. will generally accommodate most compositions.

A number of network-forming oxides have been found to exhibit the necessary criteria for forming the glass ceramic of the present invention. Among them are $SiO_2$, $Al_2O_3$, $B_2O_3$, and mixtures thereof. The network-modifying oxides act as fluxes to promote dissolution of the $ZrO_2$ in the glass met and also lower the melting point and the viscosity of $SiO_2$. Among the network-modifying oxides which have been found to be satisfactory include $Na_2O$, $K_2O$, $Li_2O$, $Rb_2O$, $CaO$, and mixtures thereof. Although $ZrO_2$ crystallizes spontaneously from the various network-forming oxides, the addition of a nucleating agent such as platinum improves the evenness of the crystal dispersion.

All these materials are used in conventional glass-forming proportions, and many of them may be added in the form of a precursor compound which yields the final glass component under glass-forming condition. For example, platinum may be added as chloroplatinic acid to yield finely dispersed metal in the glass.

The addition of an agent which stabilizes the tetragonal zirconia crystals in the glass both enhances the properties of the material and facilitates its processing. The stabilizing agent reduces the transformation temperature of tetragonal zirconia to below 1200° C., thereby allowing the ceramming temperature to be decreased and/or lengthening the duration of the ceramming heat treatment. Reduction of the ceramming temperature allows better control of crystal size and morphology and permits the precipitation of crystalline phases other than zirconia, thus further enhancing the mechanical properties of the glass ceramic. Increasing the duration of the ceramming step also affords greater control of crystal growth, at a temperature below that of the tetragonal to monoclinic transformation. As it often happens, in melts of low viscosity at temperatures below the transformation temperature, the initially precipitated tetragonal zirconia dissolves and reprecipitates in the monoclinic form in less than ten minutes, a period that is too short for adequate process control. A stabilizing agent will prolong this period to a manageable duration.

The stabilizing agents are conventionally used for preserving tetragonal zirconia in nonglass ceramics. In these instances, they are included with the monoclinic zirconia in the initial powder mixture and, on heating, they diffuse into the tetragonal zirconia formed. In glass ceramics, on the other hand, tetragonal zirconia crystallizes out of the molten mixture, and the stabilizing agent must partition strongly into the tetragonal zirconia and out of the melt. $Y_2O_3$ and $Sc_2O_3$ do this better than $MgO$ and $CaO$, and are thus preferred. The quantity of stabilizing agent to be added depends on the quantity of $ZrO_2$ precipitated and the manner in which it partitions into the $ZrO_2$. Since only a small weight-percent dissolved in the $ZrO_2$ will lower the transformation temperature quite substantially, only very small quantities of the agents, e.g., 0.1 to 1.0 percent by weight of melt, need be added.

Typical glass melt compositions of the invention can contain, on a weight basis, about 61 to 65 percent $SiO_2$, 10.5 to 15 percent $Na_2O$, and 21 to 28 percent $ZrO_2$. These relationships are illustrated in the accompanying FIGURE. On reference to that FIGURE, which is a triangular plot, there can be seen, around point 10, a phase transformation-toughened glass ceramic-forming region for the $SiO_2$-$Na_2O$-$ZrO_2$ system. Other compositions containing these compounds, which do not yield phase transformation-toughened glass ceramics are shown at point one to six. These failures to form the desired product are attributable either to the fact that they produce crystalline precipitates other than $ZrO_2$ (e.g., $ZrSiO_2$ or $Na_2ZrSi_2O_7$) or to their possession of a glass transition phase temperature that is too low to retain the tetragonal phase of $ZrO_2$.

EXAMPLE A

A specific example of the phase transformation-toughened glass ceramic within the region shown in the FIGURE can be seen at point 10. The sample composition contained, on a weight basis, 63.5 percent $SiO_2$, 11.5 percent $Na_2O$, and 25.0 percent $ZrO_2$, as well as 0.01 percent Pt. The composition was melted at 1700° C. to form a homogeneous liquid which was readily quenched to a glass. The glass was then reheated to 1200° C. for three hours. It was found that 4.5 percent of the $ZrO_2$ had crystallized and 75 percent of that quantity was finally retained in the tetragonal phase. The small amount of tetragonal $ZrO_2$ resulted in a dramatic increase in fracture toughness, i.e., from 0.95 $MNm^{\frac{1}{2}}$ for the uncerammed material to 1.5 $MNm^{\frac{1}{2}}$ for the glass ceramic. The glass ceramic had a thermal expansion of $70 \times 10^{-7}$° C., a value which matches that of Kovar, titanium, platinum and also alumina ceramics.

Other glass ceramics, which—with different heat treatments - have yielded tetragonal $ZrO_2$, are shown in the table below.

|  | Percent by Weight | | | |
| --- | --- | --- | --- | --- |
|  | B | C | D | E |
| $SiO_2$ | 53 | 46 | 57 | — |
| $ZrO_2$ | 25 | 28 | 21 | — |
| $Li_2O$ | 2 | 11 | 5 | — |
| $K_2O$ | 20 | 15 | — | — |
| $B_2O_3$ | — | — | 17 | — |
| $Y_2O_3$ | — | — | — | 0.5 |

Compositions D and E were melted at 1650° C., then heat-treated (cerammed) at 1000° C. for 15 minutes in the case of D, and for 30 minutes in the case of stabilizing agent—containing E.

It should be appreciated again that the zirconia of the present invention is dissolved in a homogeneous melt of the starting materials and precipitated out of the homogeneous melt as crystalline $ZrO_2$. This process involves precise control of the melt chemistry and temperature since otherwise, zirconia can readily crystallize with other chemical species rather than form pure $ZrO_2$ crystals. It should further be appreciated that zirconia particles cannot be simply added to a glass melt since these particles will dissolve or settle to the bottom of the crucible or furnace and not be homogeneously dispersed in the glass melt.

A plausible alternative method for incorporating tetragonal zirconia in a glass matrix, which has been considered, consists in simultaneously heating and pressing a powered glass/zirconia mixture. However, calculations have indicated that the zirconia would transform on cooling so that the method cannot be considered satisfactory. Furthermore, the number and complexity of shapes that could be formed by such a method are as severely limited as they are with conventional (non-glass) ceramic processes.

Two principal areas of usage have been identified for the phase transformation-toughened ceramic of the present invention. First, the material functions well as a structural insulation in devices such as neutron tubes or switches. Second, the material can be drawn into alkali resistance glass ceramic fibre for use in composite materials. These fibers are particularly well suited for reinforcing concrete, such as is used in explosive bunkers and reactor containment buildings. In this type of application, hardness, corrosion resistance, toughness, and low cost all constitute important properties, and the glass ceramic of the present invention should prove superior to all other materials in current use.

Homogeneity would also be inherently absent, and the crystalline microstructure would be strictly dependent on the starting materials.

Although the present invention has described the use of zirconia as the phase transformation toughening materia other substances exhibiting similar properties could be substituted for zirconia. One such substance is $HfO_2$.

Thus, while the present invention has been described with respect to exemplary embodiments thereof, it will be understood by those of ordinary skill in the art that variations and modifications can be effected within the scope and spirit of the invention.

We claim:

1. A glass-ceramic composition consisting of, in its original melt and on a weight basis, about 57 parts $SiO_2$, about 21 parts $ZrO_2$, about 5 parts $Li_2O$, and about 17 part $B_2O_3$; wherein the $ZrO_2$ in the finished glass-ceramic is present in metastable tetragonal form.

2. A glass-ceramic composition consisting of, in its original melt and on a weight basis, about 57 parts $SiO_2$, about 21 parts $ZrO_2$, about 5 parts $Li_2O$, about 17 parts $B_2O_3$, and about 0.5 parts $Y_2O_3$; wherein the $ZrO_2$ in the finished glass-ceramic is present in a metastable tetragonal form.

* * * * *